(12) United States Patent
Lee et al.

(10) Patent No.: US 12,072,694 B2
(45) Date of Patent: Aug. 27, 2024

(54) INJURY BASED RISK ASSESSMENT SOFTWARE UTILITY TOOL

(71) Applicant: GM GLOBAL TECHNOLOGY OPERATIONS LLC, Detroit, MI (US)

(72) Inventors: Rodney Lee, Clarkston, MI (US); Peter M Hannish, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 17/663,040

(22) Filed: May 12, 2022

(65) Prior Publication Data

US 2023/0367305 A1 Nov. 16, 2023

(51) Int. Cl.
G05B 23/02 (2006.01)

(52) U.S. Cl.
CPC ..... *G05B 23/0272* (2013.01); *G05B 23/0216* (2013.01); *G05B 23/0224* (2013.01)

(58) Field of Classification Search
None
See application file for complete search history.

(56) References Cited

U.S. PATENT DOCUMENTS 8,954,369 B1 * 2/2015 Presgraves ............. G05B 17/02
706/46

* cited by examiner

*Primary Examiner* — K. Wong
(74) *Attorney, Agent, or Firm* — Lorenz & Kopf LLP

(57) ABSTRACT

In accordance with exemplary embodiments, methods and systems are provided for designing a manufacturing system. In an exemplary embodiment, a method for designing a manufacturing system includes: identifying a potential hazard for the manufacturing system; evaluating, via a processor, the potential hazard with respect to a plurality of possible injuries associated with the potential hazard; and providing output, via instructions provided by the processor, with respect to the potential hazard based on the evaluating of the potential hazard with respect to the plurality of possible injuries associated with the potential hazard.

20 Claims, 5 Drawing Sheets

INJURY BASED RISK ASSESSMENT SOFTWARE UTILITY TOOL

The technical field generally relates to the field of manufacturing system design and implementation, more specifically, for optimizing a manufacturing system based on risk assessments.

Manufacturing systems may be utilized for manufacturing vehicles, equipment, processes, devices, and/or other applications. However, existing techniques for optimizing manufacturing systems may not always provide optimal results with respect to risk assessments in certain circumstances, for example due to existing challenges with respect to consistency of results and eliminating potential biases or differences in human implementation with respect to risk assessments.

Accordingly, it is desirable to provide methods and systems for optimizing manufacturing systems, including with respect to risk assessments, and including potential improvement of consistency of results and with reducing potential biases or differences in human implementation with respect to risk assessments. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is providing for designing a manufacturing system, the method including: identifying a potential hazard for the manufacturing system; evaluating, via a processor, the potential hazard with respect to a plurality of possible injuries associated with the potential hazard; and providing output, via instructions provided by the processor, with respect to the potential hazard based on the evaluating of the potential hazard with respect to the plurality of possible injuries associated with the potential hazard.

Also in an exemplary embodiment, the step of identifying the potential hazard includes obtaining, via one or more sensors, user input from a user selecting the potential hazard; and identifying the potential hazard based on the user input.

Also in an exemplary embodiment: the step of evaluating the potential hazard includes: identifying, via the processor, respective probabilities for each of the plurality of possible injuries; identifying, via the processor, respective severities for each of the plurality of possible injuries; and determining, via the processor, a respective injury potential for each of the plurality of possible injuries based on both the respective probabilities and the respective severities for each of the plurality of possible injuries; and the step of providing the output includes providing the output based on the respective injury potential for each of the plurality of possible injuries.

Also in an exemplary embodiment: the step of evaluating the potential hazard further includes determining, via the processor, a highest injury potential for the potential hazard to be a largest of the respective injury potentials; and the step of providing the output includes providing the output based on the highest injury potential.

Also in an exemplary embodiment: the method further includes identifying a frequency of a task pertaining to the potential hazard; the step of evaluating the potential hazard further includes determining, via the processor, an initial risk evaluation based on the frequency of the task in addition to the highest injury potential; and the step of providing the output includes providing the output, via the instructions provided by the processor, based on the initial risk evaluation that incorporates both the frequency of the task and the highest injury potential.

Also in an exemplary embodiment: the method further includes identifying a number of people potentially affected by the potential hazard; the step of evaluating the potential hazard further includes determining, via the processor, an initial risk evaluation based on the number of people potentially affected by the potential hazard in addition to the highest injury potential; and the step of providing the output includes providing the output, via the instructions provided by the processor, based on the initial risk evaluation that incorporates both the number of people potentially affected by the potential hazard and the highest injury potential.

Also in an exemplary embodiment: the method further includes identifying one or more potential mitigation actions to potentially mitigate one or more of the possible injuries relating to the potential hazard; the step of evaluating the potential hazard further includes: determining, via the processor, an initial risk evaluation based on the highest injury potential; and determining, via the processor, a final risk evaluation based on the initial risk evaluation and the one or more potential mitigation actions; and the step of providing the output includes providing the output, via the instructions provided by the processor, based on the final risk evaluation.

Also in an exemplary embodiment, the step of providing the output includes providing a visual display, via a display screen in accordance with the instructions provided by the processor, of the final risk evaluation.

Also in an exemplary embodiment: the method further includes identifying a frequency of a task pertaining to the potential hazard; identifying a number of people potentially affected by the potential hazard; and identifying one or more potential mitigation actions to potentially mitigate one or more of the possible injuries relating to the potential hazard; the step of evaluating the potential hazard further includes determining, via the processor, an initial risk evaluation based on the frequency of the task, the number of people potentially affected by the potential hazard, and the highest injury potential; and determining, via the processor, a final risk evaluation based on the initial risk evaluation and the one or more potential mitigation actions; and the step of providing the output includes providing a visual display, via a display screen in accordance with the instructions provided by the processor, of the final risk evaluation.

Also in an exemplary embodiment, each of the steps of repeated for each of a plurality of different potential hazards.

In another exemplary embodiment, a system is provided for designing a manufacturing system, the system including one or more sensors and a processor. The one or more sensors are configured to at least facilitate obtaining sensor data reflecting user input selecting a potential hazard for the manufacturing system. The processor is coupled to the one or more sensors and configured to at least facilitate: identifying the potential hazard based on the user input; evaluating the potential hazard with respect to a plurality of possible injuries associated with the potential hazard; and providing output, via instructions provided by the processor, with respect to the potential hazard based on the evaluating of the potential hazard with respect to the plurality of possible injuries associated with the potential hazard.

Also in an exemplary embodiment, the processor is further configured to at least facilitate: identifying respective probabilities for each of the plurality of possible injuries; identifying respective seventies for each of the plurality of possible injuries; determining a respective injury potential for each of the plurality of possible injuries based on both the respective probabilities and the respective severities for each of the plurality of possible injuries; and providing the output based on the respective injury potential for each of the plurality of possible injuries.

Also in an exemplary embodiment, the processor is further configured to at least facilitate: determining a highest injury potential for the potential hazard to be a largest of the respective injury potentials; and providing the output based on the highest injury potential.

Also in an exemplary embodiment, the processor is further configured to at least facilitate: identifying a frequency of a task pertaining to the potential hazard based on the user input; determining an initial risk evaluation based on the frequency of the task in addition to the highest injury potential; and providing the output based on the initial risk evaluation that incorporates both the frequency of the task and the highest injury potential.

Also in an exemplary embodiment, the processor is further configured to at least facilitate: identifying a number of people potentially affected by the potential hazard based on the user input; determining an initial risk evaluation based on the number of people potentially affected by the potential hazard in addition to the highest injury potential; and providing the output based on the initial risk evaluation that incorporates both the number of people potentially affected by the potential hazard and the highest injury potential.

Also in an exemplary embodiment, the processor is further configured to at least facilitate: identifying one or more potential mitigation actions to potentially mitigate one or more of the possible injuries relating to the potential hazard based on the user input; determining an initial risk evaluation based on the highest injury potential; determining a final risk evaluation based on the initial risk evaluation and the one or more potential mitigation actions; and providing the output based on the final risk evaluation.

Also in an exemplary embodiment, the processor is further configured to at least facilitate providing the output by providing the instructions to a display screen to provide a visual display of the final risk evaluation.

Also in an exemplary embodiment, the processor is further configured to at least facilitate: identifying a frequency of a task pertaining to the potential hazard from the user data; identifying a number of people potentially affected by the potential hazard from the user data; identifying one or more potential mitigation actions to potentially mitigate one or more of the possible injuries relating to the potential hazard from the user data; determining an initial risk evaluation based on the frequency of the task, the number of people potentially affected by the potential hazard, and the highest injury potential; determining a final risk evaluation based on the initial risk evaluation and the one or more potential mitigation actions; and providing the output by providing the instructions to a display screen to provide a visual display of the final risk evaluation.

Also in an exemplary embodiment, the processor is configured to at least facilitate identifying the frequency of the task pertaining to the potential hazard from the user data, identifying the number of people potentially affected by the potential hazard from the user data, identifying the one or more potential mitigation actions to potentially mitigate the one or more of the possible injuries relating to the potential hazard from the user data, determining the initial risk evaluation based on the frequency of the task, the number of people potentially affected by the potential hazard, and the highest injury potential, determining the final risk evaluation based on the initial risk evaluation and the one or more potential mitigation actions, and providing the output by providing the instructions to the display screen to provide the visual display of the final risk evaluation, for each of a plurality of different potential hazards.

In another exemplary embodiment, a system is provided for designing a manufacturing system, the system including a user device, one or more sensors, a processor, and a display device. The one or more sensors are configured to at least facilitate obtaining sensor data reflecting user input selecting a potential hazard provided by a user via the user input device. The processor is coupled to the one or more sensors, and is configured to at least facilitate: identifying the potential hazard for the manufacturing system based on the user input; evaluating the potential hazard with respect to a plurality of possible injuries associated with the potential hazard; and providing instructions for output with respect to the potential hazard based on the evaluating of the potential hazard with respect to the plurality of possible injuries associated with the potential hazard. The display device is configured to display the output in accordance with the instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
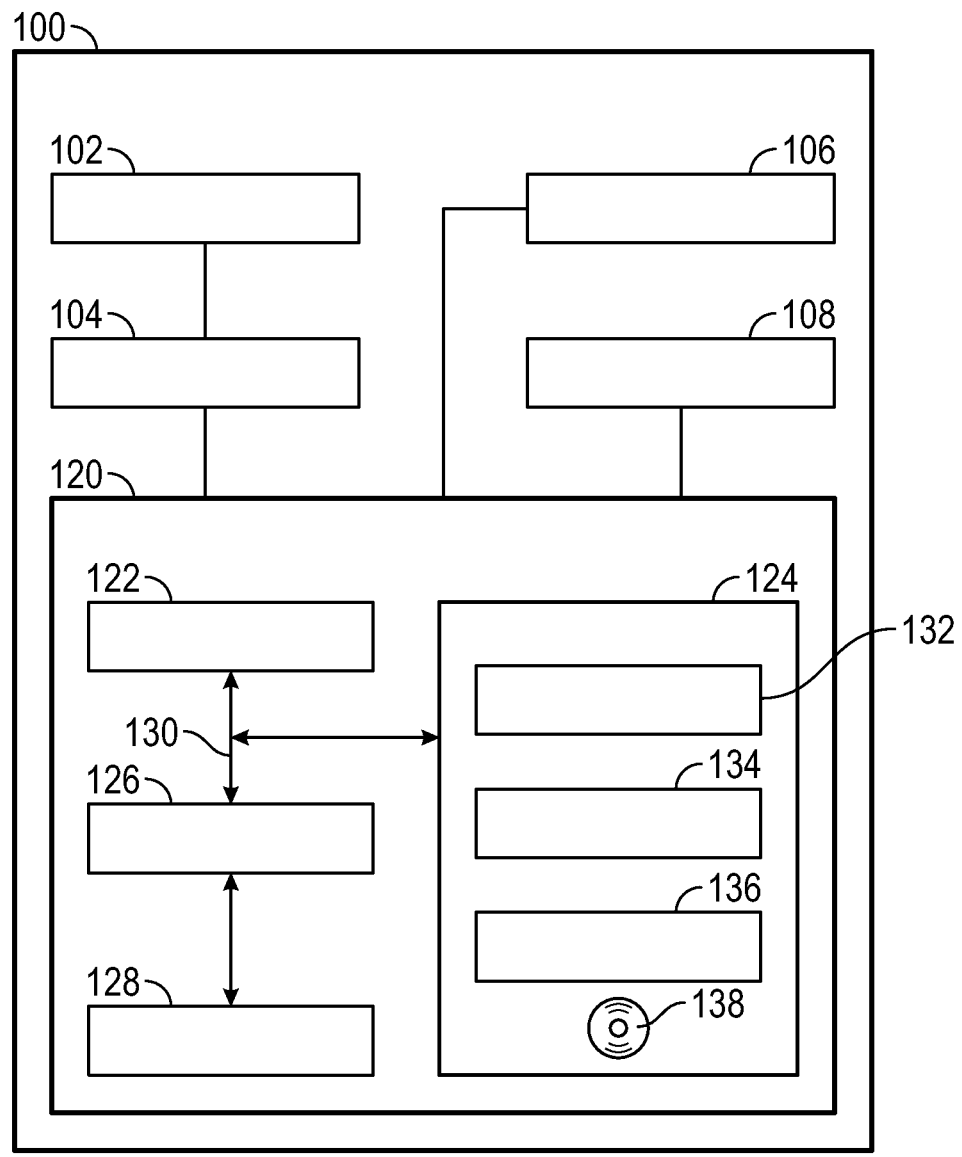
FIG. 1 is a functional block diagram of a system for use in designing a manufacturing system, in accordance with an exemplary embodiment.

FIG. 1 is a functional block diagram of a design system (also referred to herein as the "system") 100 for use in designing a manufacturing system, in accordance with an exemplary embodiment. In various embodiments, the system 100 may be utilized in designing one or manufacturing systems that may be utilized for manufacturing vehicles, equipment, processes, devices, and/or various other applications. Also in various embodiments, the system 100 is utilized in connection with the process 200 for designing one or more such manufacturing systems utilizing an analysis of risk assessments, including various steps thereof as depicted in FIGS. 2-5 and described in further detail further below in connection therewith.

With reference to FIG. 1, in various embodiments the design system 100 includes an input device 102, input sensors 104, a display 106, and a computer system 120. Also as depicted in FIG. 1, in certain embodiments the design system 100 includes one or more transceivers 108 and/or other devices and/or components.

In various embodiments, the user input device 102 is configured to be utilized by one or more users involved in the design of one or more manufacturing systems. Also in various embodiments, the user input device 102 allows the user the opportunity to select different parameters required for the risk assessment of the design of the manufacturing system. For example, as described in greater detail further below in connection with the process 200 of FIGS. 2-5, in various embodiments the user input device 102 collects user inputs as to the selection of the potential hazards, the frequency of tasks associated with the manufacturing system, and the number of people exposed to the potential hazards, along with possible mitigations for the potential hazards, and any related parameters.

In various embodiments, the user input device 102 may comprise any number of different types of devices and/or combinations thereof. For example, in certain embodiments, the input device 102 may comprise one or more touch screens, keyboards, computer mice, joysticks, buttons, knobs, dials, microphones, and/or any number of other different types of input devices and/or combinations thereof.

Also in various embodiments, the input sensors 104 are coupled to and/or integrated with the input device 102. In various embodiments, the input sensors 104 detect, measure, and/or record inputs provided by the user via the input device 102 (including, for example, as to the selection of the potential hazards, the frequency of tasks associated with the manufacturing system, and the number of people exposed to the potential hazards, along with possible mitigations for the potential hazards, and any related parameters).

In various embodiments, the display 106 provides a display and/or other notification to the user as to the designing of the manufacturing systems. In certain embodiments, the display 106 provides results of determinations (e.g., as to potential hazards, mitigations, and/or other determinations) that are made by the computer system 120 in response to the user inputs. In various embodiments, the display 106 may include one or more display screens and/or other displays that provide a visual display for the user. Also in certain embodiments, the display 106 may comprise one or more speakers that provide an audio notification for the user. In certain embodiments, the display 106 may comprise one or more actuators and/or other devices that provide haptic and/or other notifications for the user. In certain embodiments, the display 106 may be part of and/or coupled with the input device 102 and/or the input sensors 104; however, this may vary in other embodiments.

As noted above, in certain embodiments, the system 100 may also include a transceiver 108. In certain embodiments, the transceiver 108 (and/or a receiver thereof) may receive user inputs and/or other data used for designing the manufacturing systems. In addition, in certain embodiments, the transceiver 108 (and/or a transmitter thereof) may also be utilized in providing notifications to the user (e.g., as to the results of the determinations of the computer system 120).

As depicted in FIG. 1, in various embodiments, the computer system 120 comprises a processor 122, a memory 124, an interface, a storage device 128, a bus 130, and a disk 138. In certain embodiments, the computer system 120 may also include the user input device 102, input sensors 104, display 106, transceiver 108, and/or one or more other systems and/or components thereof. In addition, it will be appreciated that the computer system 120 may otherwise differ from the embodiment depicted in FIG. 1. For example, the computer system 120 may be coupled to or may otherwise utilize one or more remote computer systems and/or other control systems.

In the depicted embodiment, the computer system 120 includes a processor 122, a memory 124, an interface 126, a storage device 128, and a bus 130. The processor 122 performs the computation and control functions of the computer system 120, and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 contained within the memory 124 and, as such, controls the general operation of the computer system 120, generally in executing the processes described herein, such as the process 200 discussed further below in connection with FIGS. 2-5.

The memory 124 can be any type of suitable memory. For example, the memory 124 may include various types of dynamic random access memory (DRAM) such as SDRAM, the various types of static RAM (SRAM), and the various types of non-volatile memory (PROM, EPROM, and flash). In certain examples, the memory 124 is located on and/or co-located on the same computer chip as the processor 122. In the depicted embodiment, the memory 124 stores the above-referenced program 132 along with a plurality of algorithms 134 and stored values 136 (e.g., including, in various embodiments, tables for implementing the process 200 of FIGS. 2-5).

The bus 130 serves to transmit programs, data, status and other information or signals between the various components of the computer system 120. The interface 126 allows communications to the computer system 120, for example from a system driver and/or another computer system, and can be implemented using any suitable method and apparatus. In one embodiment, the interface 126 obtains the various data from the user input device 102, input sensors 104, display 106, transceiver 108, and/or one or more other components and/or systems. The interface 126 can include one or more network interfaces to communicate with other systems or components. The interface 126 may also include one or more network interfaces to communicate with technicians, and/or one or more storage interfaces to connect to storage apparatuses, such as the storage device 128.

The storage device 128 can be any suitable type of storage apparatus, including various different types of direct access storage and/or other memory devices. In one exemplary embodiment, the storage device 128 comprises a program product from which memory 124 can receive a program 132 that executes one or more embodiments of one or more processes of the present disclosure, such as the steps of the process 200 discussed further below in connection with FIGS. 2-5. In another exemplary embodiment, the program product may be directly stored in and/or otherwise accessed by the memory 124 and/or one or more other disks 146 and/or other memory devices.

The bus 130 can be any suitable physical or logical means of connecting computer systems and components. This includes, but is not limited to, direct hard-wired connections, fiber optics, infrared and wireless bus technologies. During operation, the program 132 is stored in the memory 124 and executed by the processor 122.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 122) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 120 may also otherwise differ from the embodiment depicted in FIG. 1, for example in that the computer system 120 may be coupled to or may otherwise utilize one or more remote computer systems and/or other control systems.

Figure 2:
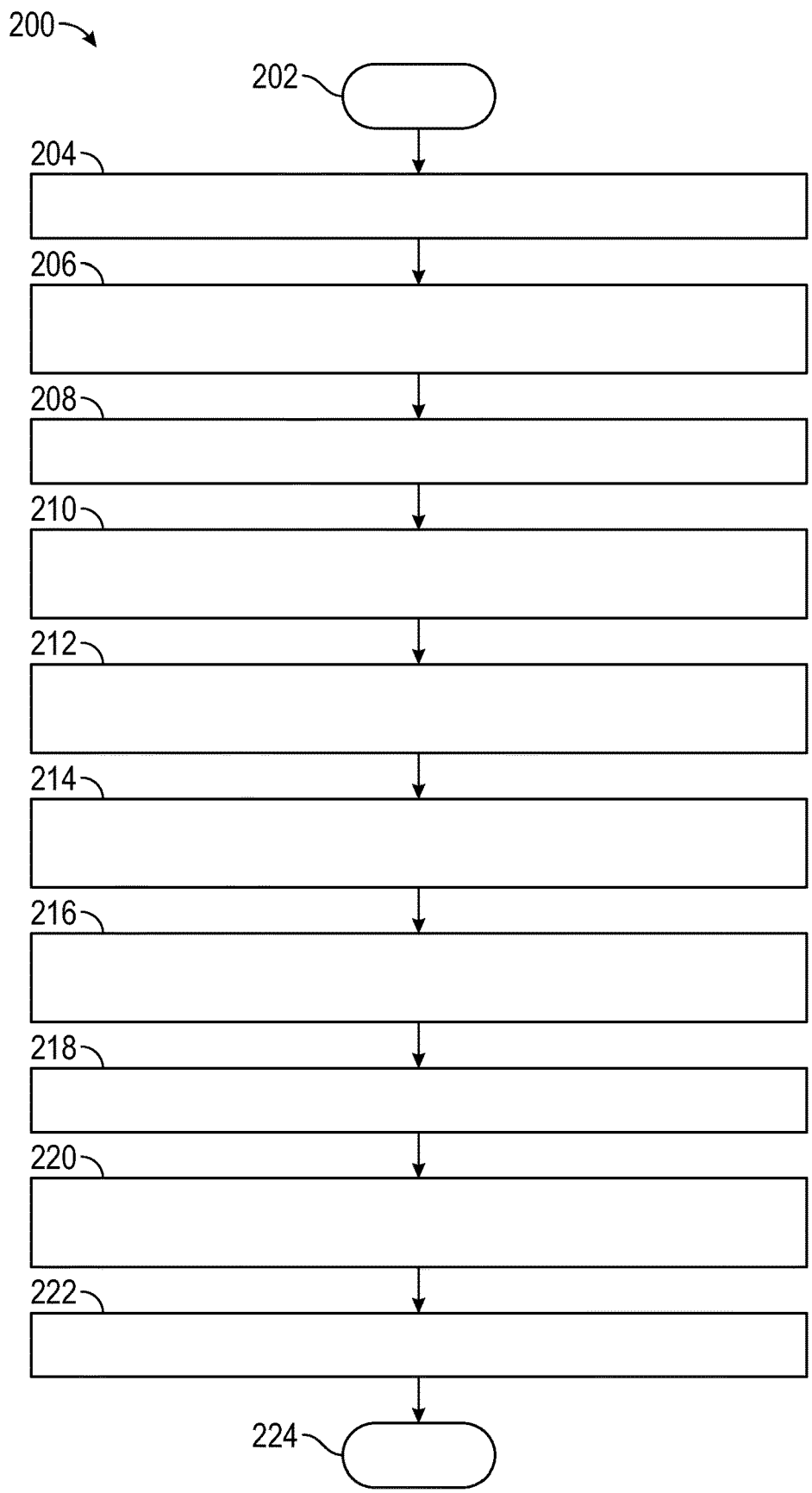
FIG. 2 is a flowchart of a process for designing a manufacturing system utilizing an analysis of risk assessments, and that can be implemented in connection with the system of FIG. 1, in accordance with an exemplary embodiment.

FIG. 2 is a flowchart of a process 200 for designing a manufacturing system utilizing an analysis of risk assessments, in accordance with an exemplary embodiment. In various embodiments, the process 200 is utilized for analysis of risk assessment for designing one or manufacturing systems that may be utilized for manufacturing vehicles, equipment, processes, devices, and/or various other applications. Also in various embodiments, the process 200 can be implemented in connection with the system 100 of FIG. 1. The process 200 is described in detail in connection with FIG. 2 as well as in connection with FIGS. 3-5, which depict illustrative steps of the process 200 of FIG. 2 in accordance with an exemplary embodiment.

As explained in greater detail below, in various embodiments, the process 200 provides analysis of each potential hazard of a manufacturing system design as compared with a number of different possible injuries or problems for each potential hazard. Also as explained in greater detail below, in various embodiments, the process 200 provides a calculated score for each of the potential hazards that incorporates both the probability and severity of each potential injury or problem, and that further incorporates potential mitigations for the various possible hazards.

As depicted in FIG. 2, in various embodiments the process 200 begins at 202. In certain embodiments, the process 200 begins when a user calls for the process 200 to begin operation, for example as the design of the manufacturing system is begun.

In various embodiments, a user selects potential hazards (step 204). In various embodiments, the user (e.g., a user that is helping to design the manufacturing system) inputs various potential hazards for each respective task of the manufacturing system that is being designed. In various embodiments, the user inputs are provided by the user via the user input device 102 of FIG. 1 and are received via one or more of the input sensors 104 of FIG. 1.

Also in various embodiments, a safety calculator table is implemented (step 206). In various embodiments, during step 206, a safety calculator is implemented in accordance with one or more algorithms 134 stored in the memory 124 of FIG. 1. Also in various embodiments, the algorithm 134 incorporates data and/or requirements of one or more governmental and/or industry organizations pertaining to safety.

Figure 3:
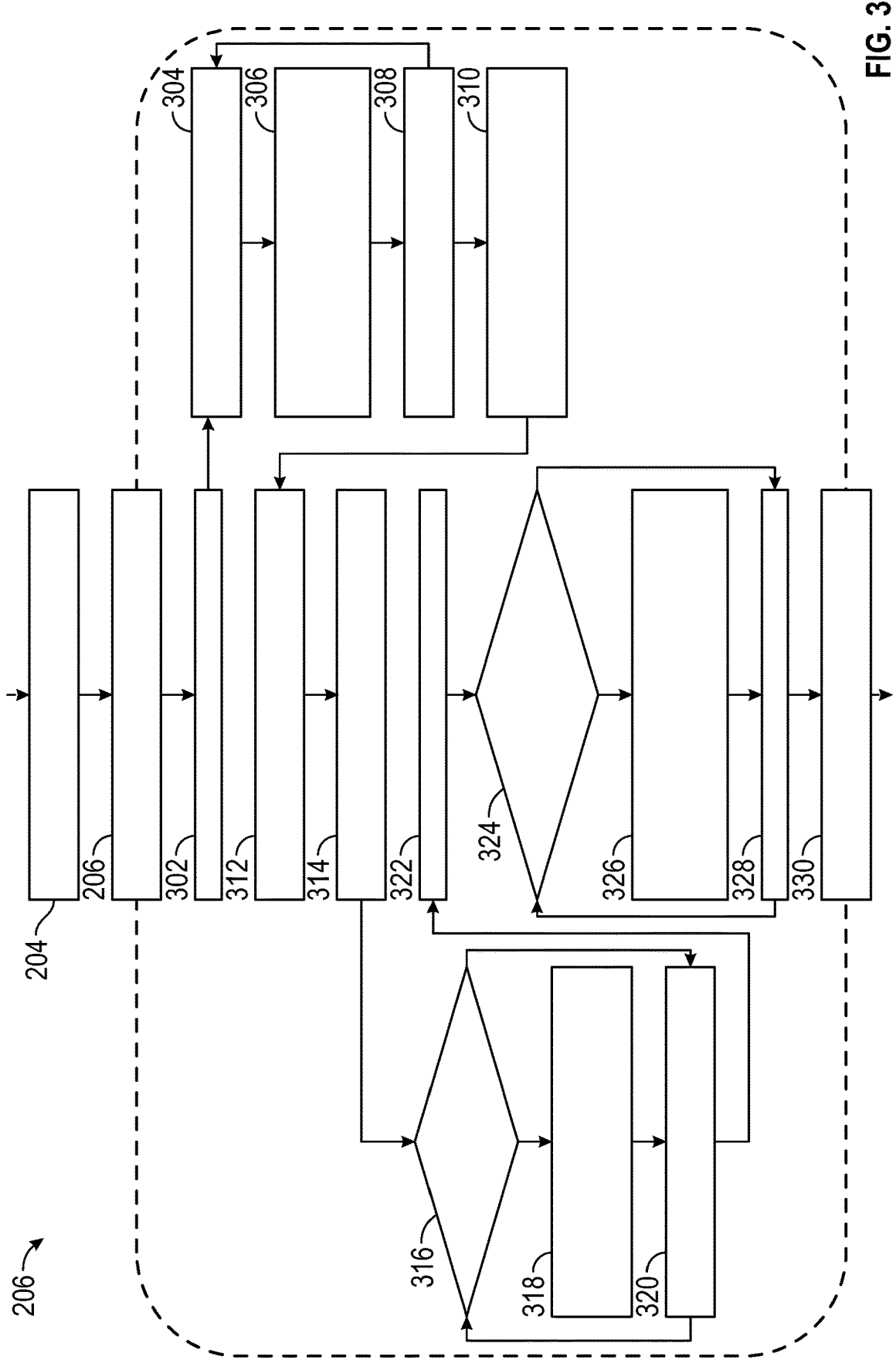
FIG. 3 is a flowchart of a process of a step of the process of FIG. 2, namely, the step of implementing a safety calculator table, in accordance with an exemplary embodiment.

With reference to FIG. 3, a flowchart is provided for the step 206 of FIG. 2, namely, the step of implementing a safety calculator table. As depicted in various embodiments, the step 206 includes a series of steps 302-330 after the user selects the hazards in step 204.

With continued reference to FIG. 3, in various embodiments, a hazard is located (step 302). In various embodiments, the processor 122 of FIG. 1 locates the hazard from a column header associated with the algorithm based on the user inputs of step 204.

In various embodiments, possible injuries are evaluated against the hazard (step 304). In various embodiments, for each hazard located in step 302, an analysis is performed with respect to each possible injury that may be associated with the hazard. In various embodiments, for each hazard, the processor 122 of FIG. 1 locates the potential injuries, including the severity thereof, from the algorithm based on the user inputs of step 204. In various embodiments, more than fifty (50) possible injuries are analyzed with respect to each potential hazard, using the analysis described herein.

Also in various embodiments, for each hazard, the highest injury potential is determined (step 306). In various embodiments, the processor 122 of FIG. 1 determines the highest priority injury potential for the particular hazard by analyzing the injury potential of each injury associated with the hazard, by considering both the seriousness ("S") of the injury as well as the probability ("P) of such injury occurring as a result of the hazard. In various embodiments, the injury potential for each injury is calculated by multiplying the seriousness ("S") by the probability ("P") of the injury in accordance with the following equation:

$$\text{Injury Potential} = S \times P \qquad \text{(Equation 1).}$$

Also in various embodiments, as part of step 306, for each hazard, the processor 122 identifies the highest injury potential as being the injury potential with the largest value among the injury potentials for each of the injuries associated with the hazard (i.e., for the injury having the highest injury potential in accordance with Equation 1 above). Also in various embodiments, the processor 122 then stores the highest injury potential for the particular hazard in the memory 124 of FIG. 1 as one of the stored values 136 thereof.

In various embodiments, the highest injury potential determination is repeated for each hazard (step 308). Specifically, in various embodiments, the determinations and calculations of steps 302-308 are repeated for each of the hazards selected by the user.

Also in various embodiments, the highest injury potential is returned (step 310). In various embodiments, for each hazard, the highest injury potential (i.e., using S×P of Equation 1) is provided for further use by the algorithm. In certain embodiments, the highest injury potential is also provided for the user via the display 106 of FIG. 1.

In various embodiments, the highest injury potential is set (step 312). In various embodiments, for each hazard, the highest injury potential (i.e., using S×P of Equation 1) is set for each hazard and is stored in memory (such as in the memory 124 of one of the stored values 136 thereof) for further use by the algorithm.

Also in various embodiments, an evaluation is conducted for any possible serious injuries or fatalities ("SIF") (step 314). In various embodiments, for each hazard, an evaluation is performed by the processor 122 of FIG. 1 with respect to any serious injuries or fatalities (e.g., including any fatalities, loss of limbs, and/or other serious injuries including permanent disabilities) that may result from each hazard. In various embodiments, these are marked as "SIF" and stored in memory (such as in the memory 124 of one of the stored values 136 thereof) for further use by the algorithm.

In various embodiments, a determination is made as to whether the injury can lead to an SIF event (step 316). In various embodiments, for each injury of each hazard, an evaluation is performed by the processor 122 of FIG. 1 with respect to whether the injury has a non-zero likelihood of leading to an SIG event (e.g., including any fatalities, loss of limbs, and/or other serious injuries including permanent disabilities).

In various embodiments, if it is determined that the injury cannot lead to an SIF event, then the process proceeds directly to step 320, described further below (without performing step 318 described below).

Conversely, in various embodiments, if it is determined that the injury can lead to an SIF event, then an SIF indicator is provided (step 318). Specifically, in various embodiments, during step 318, a notification is provided for each hazard with an indication as to whether the hazard has an SIF potential (i.e., as to whether the hazard has a possibility of causing at least one injury with an SIF event). In various embodiments, the notification/indication is provided via the display 106 of FIG. 1 in accordance with instructions provided by the processor 122 of FIG. 1. In various embodiments, a visual display is provided (e.g., on a display screen of the display 106). In certain embodiments, one or more audio, haptic, and/or other notifications may also be provided. In various embodiments, the process then proceeds to step 320, described below.

During step 320, in various embodiments, steps 302-318 are repeated for each of the hazards. Specifically, in various embodiments, steps 302-318 are repeated in various iterations for each of the hazards selected by the user (e.g., in step 204 of FIG. 2 described above), as the potential injuries are analyzed with respect to each of the selected faults. In various embodiments, the process then proceeds to step 322, described below.

During step 322, in various embodiments, safety rated solutions are evaluated. Specifically, in various embodiments, the processor 122 of FIG. 1 evaluates any known safety rated solutions for each of the potential injuries that have been identified. In various embodiments, such safety rated solutions comprise any known actions or steps that are generally accepted in the industry or field and that could potentially prevent or minimize the risks of serious injury and/or other injury for the hazard. In various embodiments, this is performed for each injury for each hazard.

In various embodiments, a determination is made as to whether any know safety rated solutions are available for the hazard (step 324). In various embodiments, this determination is made by the processor 122 of FIG. 1, based on the evaluation of step 322 above, for each of the injuries for each of the hazards selected by the user.

In various embodiments, if it is determined that there is known safety rated solution for a particular hazard, then then the process proceeds directly to step 328, described further below (without performing step 326 described below).

Conversely, in various embodiments, if it is determined that there is a known safety rated solution for a particular hazard, then a notification is provided as to whether there are any safety related solutions (step 326). Specifically, in various embodiments, during step 326, a notification is provided for each hazard with an indication as to whether there are any safety rated solutions for the hazard. In various embodiments, the notification is provided via the display 106 of FIG. 1 in accordance with instructions provided by the processor 122 of FIG. 1. In various embodiments, a visual display is provided (e.g., on a display screen of the display 106). In certain embodiments, one or more audio, haptic, and/or other notifications may also be provided. In various embodiments, the process then proceeds to step 328, described below.

During step 328, in various embodiments, steps 322-326 are repeated for each of the hazards. Specifically, in various embodiments, steps 322-326 are repeated in various iterations for each of the hazards selected by the user (e.g., in step 204 of FIG. 2 described above), as the known safety rated solutions are evaluated with respect to each of the selected faults. In various embodiments, the process then proceeds to step 330, described below.

In various embodiments, during step 330, the highest injury potential is displayed for each hazard. Specifically, in various embodiments, during step 330, a notification is provided for each hazard with a display as to the highest injury potential for each hazard. In various embodiments, the notification is provided via the display 106 of FIG. 1 in accordance with instructions provided by the processor 122 of FIG. 1. In various embodiments, a visual display is provided (e.g., on a display screen of the display 106). In certain embodiments, one or more audio, haptic, and/or other notifications may also be provided. In various embodiments, the process then proceeds to step 208 of FIG. 2, described below.

With reference back to FIG. 2, during step 208 a user selects a frequency of task. Specifically, in various embodiments, the user (e.g., a user that is helping to design the manufacturing system) inputs an expected frequency of the tasks associated with the manufacturing system that is being designed. In various embodiments, the user inputs are provided by the user via the user input device 102 of FIG. 1 and are received via one or more of the input sensors 104 of FIG. 1.

Also in various embodiments, during step 210, a selection is made as to a number of people exposed to the hazards. Specifically, in various embodiments, the user (e.g., a user that is helping to design the manufacturing system) inputs an expected number of people that would be exposed to each of the hazards for the tasks associated with the manufacturing system that is being designed. In various embodiments, the user inputs are provided by the user via the user input device 102 of FIG. 1 and are received via one or more of the input sensors 104 of FIG. 1.

Also in various embodiments, during step 212, an initial risk evaluation is performed. Specifically, in various embodiments, the processor 122 of FIG. 1 calculates an initial risk evaluation for each hazard. In certain embodiments, the processor 122 calculates the initial risk evaluation separately for each hazard in accordance with the following equation:

$$IRE = S \times P \times F \times N \qquad \text{(Equation 2),}$$

in which "IRE" represents the initial risk evaluation for the hazard; "S" represents the severity of injury from the hazard and "P" represents the probability of injury associated with the hazard; "F" represents the frequency of performance of the task for the hazard; and "N" represents the number of people exposed to the hazard.

In various embodiments, during step 214, a user selects engineering mitigations to address possible injuries associated with the hazard. Specifically, in various embodiments, the user (e.g., a user that is helping to design the manufacturing system) inputs one or more selected engineering mitigations from a menu of possible engineering mitigations that are displayed on the display 106 of FIG. 1 in accordance with instructions provided by the processor 122 of FIG. 1. In various embodiments, possible engineering mitigations are only displayed if they meet appropriate safety standards for the industry or field. Accordingly, in various embodiments, the user is only permitted to select mitigation actions that align with a respective safety rating. In certain embodiments, such possible engineering mitigations may include, among others, in appropriate circumstances: safety scanners, safety light curtains, safety relays, and so on. In various embodiments, the user inputs in selected one or more of the displayed possible engineering mitigations are provided by the user via the user input device 102 of FIG. 1 and are received via one or more of the input sensors 104 of FIG. 1.

Also in various embodiments, an engineering mitigation table is implemented (step 216). In various embodiments, during step 216, an engineering mitigation table is implemented in accordance with one or more algorithms 134 stored in the memory 124 of FIG. 1. Also in various embodiments, the algorithm 134 incorporates data and/or requirements of one or more governmental and/or industry organizations pertaining to safety.

Figure 4:
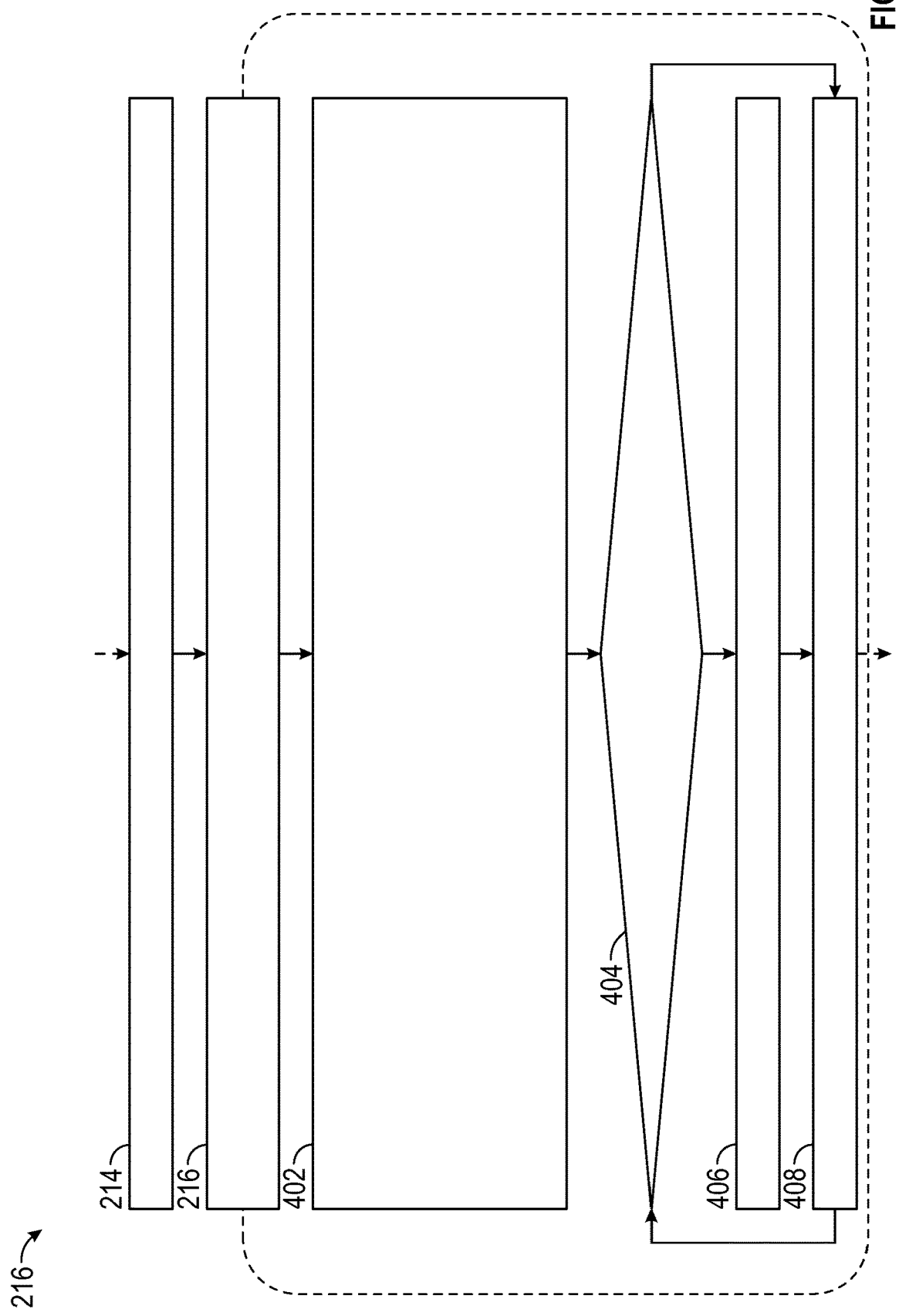
FIG. 4 is a flowchart of a process of a step of the process of FIG. 2, namely, the step of implementing a mitigation truth table, in accordance with an exemplary embodiment.

With reference to FIG. 4, a flowchart is provided for the step 216 of FIG. 2, namely, the step of implementing an engineering mitigation truth table. As depicted in various embodiments, the step 216 includes a series of steps 402-408 after the user selects the engineering mitigations in step 214.

With continued reference to FIG. 4, each solution is initially set to a predefined rating (step 402). Specifically, in various embodiments, for each potential injury of each hazard, the processor 122 of FIG. 1 sets the respective solution to a predefine rating based on data previously stored in the memory 124 as stored values 136 and/or via an applicable algorithm 134. Also in various embodiments, the predefined ratings are selected from one of a plurality of predetermined rating categories that include the following: (i) "None" (meaning that no mitigations are available); (ii) "Administrative Controls" (meaning that one or more administrative controls, such as training safety signage, personal protective equipment, or the like are available); (iii) "Task Monitoring" (meaning that an additional person assigned to a task, such as a spotter, may be available to utilize); (iv) "Engineering Control" (meaning that one or more non-safety rated control designs may be implemented, such as guarding, machine controls, and so on); and/or (v) "Safety Rated Engineering Controls" (meaning that one or more safety rated control designs, such as safety scanners, safety light curtains, safety relays, and the like may be implemented).

Also in various embodiments, a determination is made as to whether the task requires a pre-task plan ("PTP") or mitigation that is not safety rated (step 404). In various embodiments, this determination is made by the processor 122 of FIG. 1 based on the previously obtained data as well as the settings of step 402.

In various embodiments, if it is determined that the task does not require PTP or mitigation that is not safety rated, then the process proceeds directly to step 408, described further below (without performing step 406 described below). Specifically, in various embodiments, when it is determined the task does not require PTP or mitigation that is not safety related, then all possible PTP and mitigation options are displayed for the user (e.g., via the display 106 of FIG. 1), and the process then proceeds to step 408.

Conversely, in various embodiments, if it is determined that the task does require PTP or mitigation that is not safety rated, then the process proceeds instead to 406. During step 406, the processor 122 of FIG. 1 prohibits safety related engineering controls from being displayed (e.g., on the display 106) and prohibits safety related engineering controls form being selected (by the user). Accordingly, in various embodiments, the user is only allowed to select mitigations that conform with accepted safety practices. In various embodiments, the process then proceeds to step 408, described below.

During step 408, in various embodiments, steps 402-406 are repeated for each of the hazards. Specifically, in various embodiments, steps 402-406 are repeated in various iterations for each of the potential mitigations and each of the injuries and hazards selected by the user. In various embodiments, the process then proceeds to step 218 of FIG. 2, described below.

With reference back to FIG. 2, in various embodiments, during step 218, additional user inputs are obtained. Specifically, in various embodiments, the user (e.g., a user that is helping to design the manufacturing system) provides inputs for one or more additional mitigations and/or comments (e.g., from a design team). In certain embodiments, the additional user inputs may include one or more additional selected engineering mitigations from the menu of possible engineering mitigations, and any additional selected engineering mitigations are then analyzed by repeating step 216 in a new iteration with respect to the additional selected engineering mitigations. In addition, in certain embodiments, the comments may include a user's (or team's) assessment with respect to the results of step 214, and for example may be incorporated into future iterations in certain embodiments.

In various embodiments, a final risk evaluation calculator is implemented (step 220). In various embodiments, during step 220, the final risk evaluation calculated is implemented by the processor 122 of FIG. 1 in accordance with one or more algorithms 134 stored in the memory 124 of FIG. 1.

Figure 5:
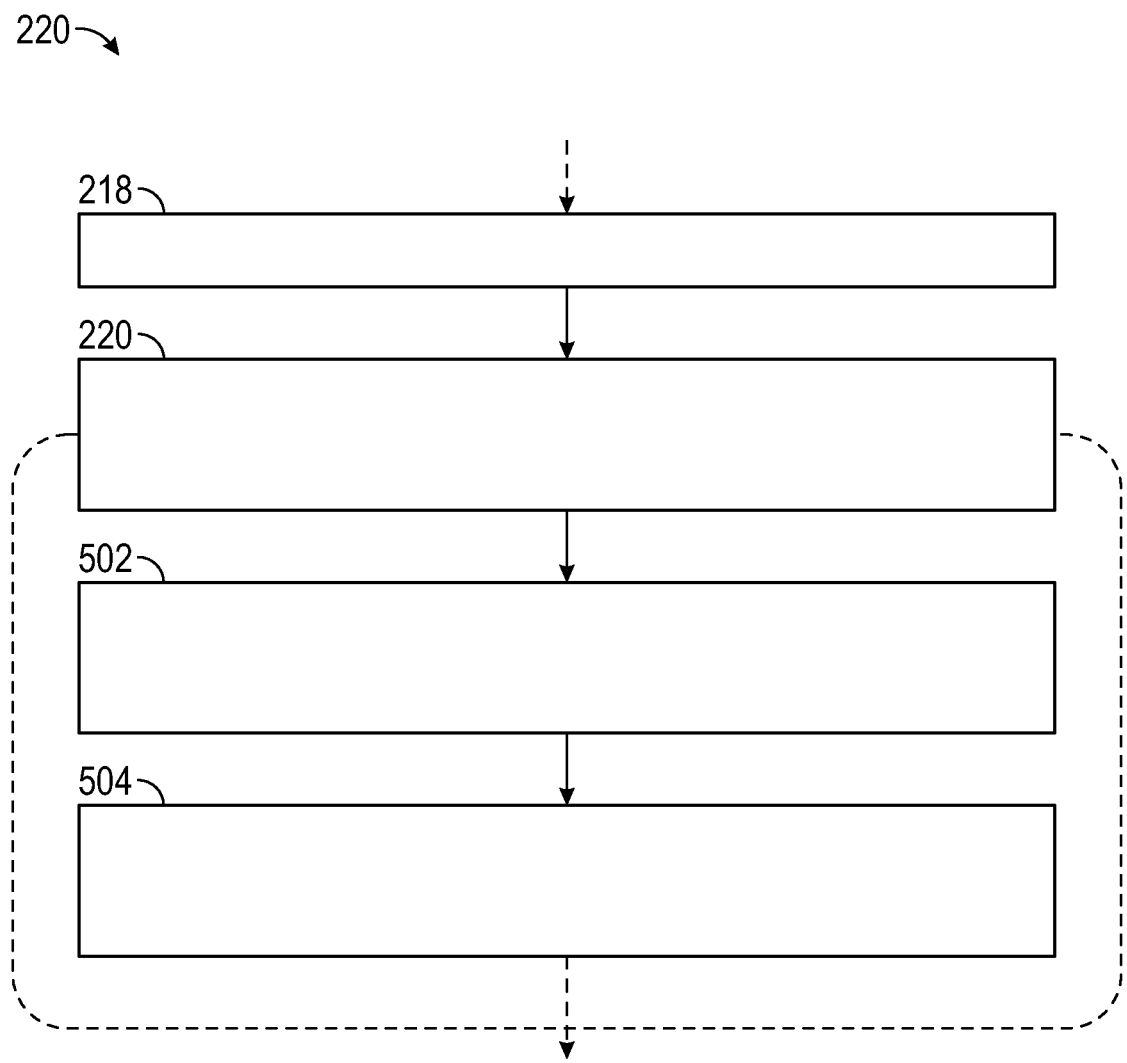
FIG. 5 is a flowchart of a process of another step of the process of FIG. 2, namely, the step of implementing a final risk evaluation calculator, in accordance with an exemplary embodiment.

With reference to FIG. 5, a flowchart is provided for the step 220 of FIG. 2, namely, the step of implementing the final risk evaluation calculator. As depicted in various embodiments, the step 220 includes a series of steps 502-504 after the user selects any additional mitigations in step 218.

With continued reference to FIG. 5, a final risk evaluation ("FRE") is performed for the task (step 502). In certain embodiments, the processor 122 of FIG. 1 calculates the FRE based on the inputs that have been previously provided by the user, and based on the various calculations performed by the processor 122 using the inputs as described above. In certain embodiments, the processor 122 calculates the FRE based on the initial risk evaluation (IRE) of step 212 in combination with the mitigations selected by the user in steps 214 and/or 218 and the evaluation thereof in step 216. In certain embodiments, the FRE for the task is then classified into one of the following categories (listed in increasing order of severity): (i) "Negligible"; (ii) "Low"; (iii) "Medium"; "High"; and (iv) "Unacceptable").

Also in various embodiments, a determination is also made as to high-risk inventory (step 504). Specifically, in certain embodiments, the processor 122 of FIG. 1 determines an indication as to whether a high-risk inventory is provided for the manufacturing site (e.g., at the facility and/or plant in which the manufacturing will be occurring). For example, in certain embodiments, a high-risk inventory may comprise, among others, certain types of inventory that may potentially result in an explosion, harmful, and/or other potentially dangerous events.

In various embodiments, the process then proceeds to step 222 of FIG. 2.

With reference back to FIG. 2, in various embodiments, during step 222 the final evaluation (FRE) results are displayed. Specifically, in various embodiments, during step 222, the FRE results of step 502 are provided for the user. In certain embodiments, the indication of step 504 are also provided as to whether a high-risk inventory is required. In various embodiments, the FRE results and indication are provided via the display 106 of FIG. 1 in accordance with instructions provided by the processor 122 of FIG. 1. In various embodiments, visual results and indications are provided (e.g., on a display screen of the display 106). In certain embodiments, one or more audio, haptic, and/or other results and/or indications may also be provided.

In various embodiments, the process terminates at step 224.

Accordingly, methods and systems are provided for designing a manufacturing system utilizing an analysis of risk assessments. In various embodiments, the disclosed methods and systems provide analysis of each potential hazard of a manufacturing system design as compared with a number of different possible injuries or problems for each potential hazard. Also in various embodiments, the disclosed methods and systems also provide a calculated score for each of the potential hazards that incorporates both the probability and severity of each potential injury or problem, and that further incorporates potential mitigations for the various possible hazards.

It will be appreciated that the methods and systems may vary from those depicted in the Figures and described herein. For example, in various embodiments, the design system 100 and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIGS. 2-5 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for designing a manufacturing system, the method comprising:
    identifying a potential hazard for the manufacturing system that could lead to injury of one or more individuals involved with the manufacturing system;
    evaluating, via a processor, the potential hazard with respect to a plurality of possible injuries associated with the potential hazard; and
    providing output, via instructions provided by the processor, with respect to the potential hazard based on the evaluating of the potential hazard with respect to the plurality of possible injuries associated with the potential hazard;
    wherein:
    the step of evaluating the potential hazard comprises:
        identifying, via the processor, respective probabilities for each of the plurality of possible injuries;
        identifying, via the processor, respective severities for each of the plurality of possible injuries; and
        determining, via the processor, a respective injury potential for each of the plurality of possible injuries based on both the respective probabilities and the respective severities for each of the plurality of possible injuries, namely, by multiplying the respective probabilities by the respective severities for each of the plurality of possible injuries; and
    the step of providing the output comprises providing the output based on the respective injury potential for each of the plurality of possible injuries.

2. The method of claim 1, wherein the step of identifying the potential hazard comprises:
    obtaining, via one or more sensors, user input from a user selecting the potential hazard; and
    identifying the potential hazard based on the user input.

3. The method of claim 1, wherein:
    the step of evaluating the potential hazard further comprises determining, via the processor, a highest injury potential for the potential hazard to be a largest of the respective injury potentials; and
    the step of providing the output comprises providing the output based on the highest injury potential.

4. The method of claim 3, further comprising:
    identifying a frequency of a task pertaining to the potential hazard;
    wherein:
        the step of evaluating the potential hazard further comprises determining, via the processor, an initial risk evaluation based on the frequency of the task in addition to the highest injury potential; and
        the step of providing the output comprises providing the output, via the instructions provided by the processor, based on the initial risk evaluation that incorporates both the frequency of the task and the highest injury potential.

5. The method of claim 3, further comprising:
    identifying a number of people potentially affected by the potential hazard;
    wherein:
        the step of evaluating the potential hazard further comprises determining, via the processor, an initial risk evaluation based on the number of people potentially affected by the potential hazard in addition to the highest injury potential; and
        the step of providing the output comprises providing the output, via the instructions provided by the processor, based on the initial risk evaluation that incorporates both the number of people potentially affected by the potential hazard and the highest injury potential.

6. The method of claim 3, further comprising:
    identifying one or more potential mitigation actions to potentially mitigate one or more of the possible injuries relating to the potential hazard;
    wherein:
        the step of evaluating the potential hazard further comprises:

determining, via the processor, an initial risk evaluation based on the highest injury potential; and
determining, via the processor, a final risk evaluation based on the initial risk evaluation and the one or more potential mitigation actions; and
the step of providing the output comprises providing the output, via the instructions provided by the processor, based on the final risk evaluation.

7. The method of claim 6, wherein the step of providing the output comprises providing a visual display, via a display screen in accordance with the instructions provided by the processor, of the final risk evaluation.

8. The method of claim 3, further comprising:
identifying a frequency of a task pertaining to the potential hazard;
identifying a number of people potentially affected by the potential hazard; and
identifying one or more potential mitigation actions to potentially mitigate one or more of the possible injuries relating to the potential hazard;
wherein:
the step of evaluating the potential hazard further comprises:
determining, via the processor, an initial risk evaluation based on the frequency of the task, the number of people potentially affected by the potential hazard, and the highest injury potential; and
determining, via the processor, a final risk evaluation based on the initial risk evaluation and the one or more potential mitigation actions; and
the step of providing the output comprises providing a visual display, via a display screen in accordance with the instructions provided by the processor, of the final risk evaluation.

9. The method of claim 8, wherein each of the steps of repeated for each of a plurality of different potential hazards.

10. The method of claim 1, further comprising:
determining, via the processor, a frequency of performance of a task pertaining to the hazard;
determining, via the processor, a number of people exposed to the hazard; and
calculating, via the processor, a risk evaluation (RE) for the hazard, based on the following equation:

$$RE = S \times P \times F \times N,$$

in which "S" represents the severity of injury from the hazard, "P" represents the probability of injury associated with the hazard; "F" represents the frequency of performance of the task for the hazard; and "N" represents the number of people exposed to the hazard.

11. The method of claim 6, wherein the step of determining the final risk evaluation is based on a plurality engineering mitigations for the manufacturing system.

12. The method of claim 11, wherein the plurality of engineering mitigations for the manufacturing system include each of the following, in appropriate circumstances: safety scanners, safety light curtains, and safety relays.

13. A system for designing a manufacturing system, the system comprising:
one or more sensors configured to at least facilitate obtaining sensor data reflecting user input selecting a potential hazard for the manufacturing system that could lead to injury of one or more individuals involved with the manufacturing system; and
a processor coupled to the one or more sensors and configured to at least facilitate:
identifying the potential hazard based on the user input;
evaluating the potential hazard with respect to a plurality of possible injuries associated with the potential hazard; and
providing output, via instructions provided by the processor, with respect to the potential hazard based on the evaluating of the potential hazard with respect to the plurality of possible injuries associated with the potential hazard;
wherein the processor is further configured to at least facilitate:
identifying respective probabilities for each of the plurality of possible injuries;
identifying respective severities for each of the plurality of possible injuries;
determining a respective injury potential for each of the plurality of possible injuries based on both the respective probabilities and the respective severities for each of the plurality of possible injuries, namely, by multiplying the respective probabilities by the respective severities for each of the plurality of possible injuries; and
providing the output based on the respective injury potential for each of the plurality of possible injuries.

14. The system of claim 13, wherein the processor is further configured to at least facilitate:
identifying respective probabilities for each of the plurality of possible injuries;
identifying respective severities for each of the plurality of possible injuries;
determining a respective injury potential for each of the plurality of possible injuries based on both the respective probabilities and the respective severities for each of the plurality of possible injuries; and
providing the output based on the respective injury potential for each of the plurality of possible injuries.

15. The system of claim 13, wherein the processor is further configured to at least facilitate:
identifying a frequency of a task pertaining to the potential hazard based on the user input;
determining an initial risk evaluation based on the frequency of the task in addition to the highest injury potential; and
providing the output based on the initial risk evaluation that incorporates both the frequency of the task and the highest injury potential.

16. The system of claim 13, wherein the processor is further configured to at least facilitate:
identifying a number of people potentially affected by the potential hazard based on the user input;
determining an initial risk evaluation based on the number of people potentially affected by the potential hazard in addition to the highest injury potential; and
providing the output based on the initial risk evaluation that incorporates both the number of people potentially affected by the potential hazard and the highest injury potential.

17. The system of claim 13, wherein the processor is further configured to at least facilitate:
identifying one or more potential mitigation actions to potentially mitigate one or more of the possible injuries relating to the potential hazard based on the user input;
determining an initial risk evaluation based on the highest injury potential;
determining a final risk evaluation based on the initial risk evaluation and the one or more potential mitigation actions;

providing the output based on the final risk evaluation; and providing the instructions to a display screen to provide a visual display of the final risk evaluation.

18. The system of claim 13, wherein the processor is further configured to at least facilitate:

identifying a frequency of a task pertaining to the potential hazard from the user data;

identifying a number of people potentially affected by the potential hazard from the user data;

identifying one or more potential mitigation actions to potentially mitigate one or more of the possible injuries relating to the potential hazard from the user data;

determining an initial risk evaluation based on the frequency of the task, the number of people potentially affected by the potential hazard, and the highest injury potential;

determining a final risk evaluation based on the initial risk evaluation and the one or more potential mitigation actions; and providing the output by providing the instructions to a display screen to provide a visual display of the final risk evaluation;

wherein the processor is configured to at least facilitate identifying the frequency of the task pertaining to the potential hazard from the user data, identifying the number of people potentially affected by the potential hazard from the user data, identifying the one or more potential mitigation actions to potentially mitigate the one or more of the possible injuries relating to the potential hazard from the user data, determining the initial risk evaluation based on the frequency of the task, the number of people potentially affected by the potential hazard, and the highest injury potential, determining the final risk evaluation based on the initial risk evaluation and the one or more potential mitigation actions, and providing the output by providing the instructions to the display screen to provide the visual display of the final risk evaluation, for each of a plurality of different potential hazards.

19. The system of claim 13, wherein the processor is further configured to at least facilitate:

determining a frequency of performance of a task pertaining to the hazard;

determining a number of people exposed to the hazard; and calculating a risk evaluation (RE) for the hazard, based on the following equation:

$$RE = S \times P \times F \times N,$$

in which "S" represents the severity of injury from the hazard, "P" represents the probability of injury associated with the hazard; "F" represents the frequency of performance of the task for the hazard; and "N" represents the number of people exposed to the hazard.

20. A system for designing a manufacturing system, the system comprising:

a user input device;

one or more sensors configured to at least facilitate obtaining sensor data reflecting user input selecting a potential hazard provided by a user via the user input device that could lead to injury of one or more individuals involved with the manufacturing system; and a processor coupled to the one or more sensors and configured to at least facilitate:

identifying the potential hazard for the manufacturing system based on the user input;

evaluating the potential hazard with respect to a plurality of possible injuries associated with the potential hazard; and providing instructions for output with respect to the potential hazard based on the evaluating of the potential hazard with respect to the plurality of possible injuries associated with the potential hazard;

wherein the processor is further configured to at least facilitate:

identifying respective probabilities for each of the plurality of possible injuries;

identifying respective severities for each of the plurality of possible injuries;

determining a respective injury potential for each of the plurality of possible injuries based on both the respective probabilities and the respective severities for each of the plurality of possible injuries, namely, by multiplying the respective probabilities by the respective severities for each of the plurality of possible injuries; and providing the instructions for the output based on the respective injury potential for each of the plurality of possible injuries; and a display device configured to display the output in accordance with the instructions provided by the processor.

* * * * *